United States Patent Office 2,910,450
Patented Oct. 27, 1959

2,910,450

PROCESS OF DISPERSING PIGMENTS OR RESINS IN POLYSTYRENE USING BORIC ACID

Daniel A. Popielski, Springfield, Mass., assignor to Monsanto Chemical Company, St. Louis, Mo., a corporation of Delaware No Drawing. Application January 24, 1956
Serial No. 561,131

4 Claims. (Cl. 260—41)

The present invention relates to an improved process for extruding styrene polymers and in particular relates to a process in which novel additives are incorporated in the styrene polymer to provide a more uniform extrusion and a more vigorous mixing action within the extruder barrel.

In the sale and distribution of styrene polymers, it is customary to extrude styrene polymer particles into strands which are chopped into pellets of uniform size for shipment to the molding trade. Such pellets are convenient to handle and, in addition, by employing an extrusion step, colorants, stabilizers and other additives may be incorporated into the styrene polymer particles. The extrusion step, however, frequently causes manufacturing difficulties. In many cases, the styrene polymer does not extrude at a constant rate, but is discharged through the extruder orifice in pulsating surges. Such surging causes variation in the diameter of the extruded strands and, if this variation in strand size is severe, it may give rise to technical difficulties at the strand cutting station. Moreover, the mixing action within the extruder barrel is not as efficient as desired and frequently the styrene polymer must be passed through the extruder two or more times to obtain the desired homogeneity in the final product.

It is an object of this invention to provide an improved process for extruding styrene polymers.

Another object of this invention is to provide an improved process for extruding styrene polymers in which the extruded polymer strands have substantially constant diameters.

Yet another object of this invention is to provide an improved process for extruding styrene polymers in which good mixing action is obtained within the extruder barrel.

The present invention provides an improved process for extruding styrene polymers in which from about 0.02 part to about 2 parts of boric acid are admixed with 100 parts of styrene polymer before the resulting composition is passed through a screw-type extruder. The addition of the boric acid to the styrene polymer provides a smooth steady rate of extrusion which is essentially free of pulsating surges and also provides an intensive and efficient mixing action within the barrel of the extruder.

The following examples are set forth to illustrate more clearly the principle and practice of this invention to those skilled in the art. All parts are by weight.

EXAMPLE I

Part A

Fine beads of a commercial grade polystyrene having a molecular weight of approximately 65,000 and having admixed therewith a small quantity of colorant and stearic acid lubricant are passed through a six-inch screw-type extruder. The die opening at the discharge end of the extruder contains a plurality of ⅛″ squares and the take-off conveyor belt is operated at such a speed that ⅛″ strands are obtained when the extruder is operated at a constant discharge rate. The extrusion of the polystyrene is erratic and the polymer is discharged from the extruder in pulsating surges. The extruded strands have diameters varying in thicknesses from about ¼₄″ to about ⅝″.

Part B

Part A is repeated except that in addition 0.1 part of boric acid is admixed with 100 parts of the polystyrene. The extrusion proceeds at a constant rate with essentially all of the strands having a diameter of approximately ⅛″.

EXAMPLE II

Example I is repeated except that the polystyrene is replaced with a blend of 90 parts polystyrene and 10 parts of a butadiene-styrene copolymer containing equal weight percentages of the two comonomers. This blend of polystyrene and butadiene-styrene copolymer is prepared by the method of U.S. 2,727,878. As in Example I, an irregular rate of extrusion with many pulsating surges is obtained in the absence of boric acid, whereas in the presence of 0.1% boric acid a smooth steady extrusion is obtained.

EXAMPLE III

The quantitative effect of boric acid in providing improved mixing action within the extruder barrel is measured on a red polystyrene formulation containing 4 grams of titanium dioxide and 2 grams of a red cadmium sulfoselenide pigment per pound of polystyrene. This particular polymer formulation is chosen, because it is known that the cadmium sulfoselenide pigments are difficult to incorporate into styrene polymers. Tests are run on both the basic formulation and on formulations containing 0.2% zinc stearate or 0.2% stearic acid as a lubricant.

The polystyrene granules, the colorants, the lubricant (if any) and 0.1% boric acid are dry-blended for two hours in a tumbling type laboratory blender. Similar blends are prepared in which the boric acid is excluded. Each batch of blended polymer is then passed through a one and one-half inch screw type extruder operating under standard conditions and the extruded strands are cut into approximately ⅛″ pellets. Four rectangular pieces measuring 3″ x 7″ x ¼″ are prepared from each batch of pellets by a standard injection molding procedure.

The intensity and efficiency of the mixing action in the extruder are measured in two ways. First, each set of four colored rectangular pieces are visually inspected and the colored specks of undispersed pigment are counted. Secondly, the percentage of incident light reflected from the colored rectangles is measured spectrophotometrically at a wave length of 560 mu. The results of these evaluations are set forth in Table I.

| Sample No. | Lubricant | Boric Acid | Number of Undispersed Pigment Particles | Percent Incident Light Reflected at 560 mu |
|---|---|---|---|---|
| 1 | None | No | 65 | 30.9 |
| 1a | do | Yes | 0 | 28.7 |
| 2 | Zinc Stearate | No | 120 | 30.6 |
| 2a | do | Yes | 0 | 26.8 |
| 3 | Stearic Acid | No | 136 | 30.7 |
| 3a | do | Yes | 0 | 28.1 |

The reduction in the number of undispersed pigment particles appearing in the molded specimens containing the boric acid is striking. The effect of the boric acid in reducing the percentage of incident light reflected from the molded specimens indicates a more intense color that results from the better mixing action which takes place within the extruder barrel.

The boric acid that is incorporated in the styrene polymer is the ordinary article of commerce and no special purification treatments are required. In addition, the boric acid need not be dried to an anhydrous condition. As little as 0.02 part of boric acid per 100 parts of styrene polymer has a noticeable effect in improving the extrusion process and there is little advantage obtained in incorporating more than 2 parts of boric acid in 100 parts of styrene polymer. In a preferred embodiment of the invention from about 0.05 to about 0.5 part of boric acid is employed per 100 parts of styrene polymer.

The styrene polymers whose extrusions are improved by the addition of boric acid are homopolymers of styrene and interpolymers of styrene containing more than 50 weight percent styrene and preferably at least 85 weight percent of styrene. Where styrene interpolymers are employed, the balance of the polymer may be essentially any vinyl monomer interpolymerizable with styrene such as butadiene, the acrylate esters, acrylonitrile, the methacrylate esters, etc. Such styrene polymers in general will have molecular weights of from about 40,000 to 100,000 as calculated by the Staudinger equation. All or a part of the styrene may be replaced with its closely related homologues such as alpha-methylstyrene, vinyl toluene, p-ethylstyrene, 2,4-dimethylstyrene, etc.

The process of the present invention has particular utility where it is desired to incorporate a difficultly dispersible material in a styrene polymer. Specifically, the process is highly valuable where it is desired to incorporate in the styrene polymer a rubbery diene polymer to prepare polyblends, or where it is desired to incorporate in the styrene polymer difficultly dispersible pigments such as ultramarine blue, phthalocyanine green, phthalocyanine blue, the chrome green pigments and especially the cadmium sulfide, cadmium selenide and cadmium sulfoselenide pigments. The rubbery diene polymers which may be incorporated in the styrene polymer by the method of this invention include natural rubber, homopolymers of conjugated 1,3-dienes such as polybutadiene, synthetic polyisoprene, etc., rubbery interpolymers of conjugated 1,3-dienes such as rubbery butadiene-styrene interpolymers, rubbery butadiene-acrylonitrile interpolymers, rubbery isobutylene-isoprene interpolymers as exemplified by Butyl rubber, etc. and mixtures of such rubbery diene polymers. The difficultly dispersible pigments which may be incorporated in the styrene polymer especially advantageously by the method of this invention include cadmium sulfide pigments, cadmium selenide pigments, cadmium sulfoselenide pigments prepared by firing cadmium with mixtures of sulfur and selenium and mixtures of such cadmium pigments.

The process of this invention can be carried out in any screw-type plastic extruder. Extruders of this type are well known in the art and for this reason are not described herein. For typical examples of screw-type extruders that may be employed see any of the following patents: U.S. 2,407,503; U.S. 2,595,455 and U.S. 2,662,243.

The above descriptions and particularly the examples are set forth by way of illustration only. Many variations and modifications thereof will be apparent to those skilled in the art and can be made without departing from the spirit and scope of the invention herein disclosed.

What is claimed is:

1. In an extrusion process in which a mixture of a particulate styrene polymer and a material that is to be incorporated in said styrene polymer is charged to an extrusion apparatus in which the styrene polymer is melted, advanced through the apparatus, subjected to high shear forces and discharged through an orifice; the improvement which comprises intimately admixing 0.02–2.0 parts by weight of boric acid with 100 parts by weight of the particulate styrene polymer before charging the styrene polymer to the extrusion apparatus, said added boric acid being the only boric acid present in the final admixture, said material that is to be incorporated in the styrene polymer being selected from the group consisting of tinctorial pigments and a rubbery diene polymer selected from the group consisting of natural rubber, homopolymers of conjugated 1,3-dienes, rubbery interpolymers of conjugated 1,3-dienes and mixtures thereof.

2. The process of claim 1 in which from about 0.05 to about 0.5 part by weight of boric acid is employed per 100 parts by weight of the styrene polymer.

3. The process of claim 1 in which the material that is to be incorporated in the styrene polymer is a rubbery interpolymer of butadiene and styrene.

4. The process of claim 1 in which the material that is to be incorporated in the styrene polymer is a calcium sulfoselenide pigment.

References Cited in the file of this patent

UNITED STATES PATENTS

| | | |
|---|---|---|
| 2,163,067 | Schellenger | June 20, 1939 |
| 2,338,580 | Fordyce | Jan. 4, 1944 |
| 2,367,810 | Turkington et al. | Jan. 23, 1945 |
| 2,747,224 | Koch et al. | May 29, 1956 |